Patented Sept. 9, 1924.

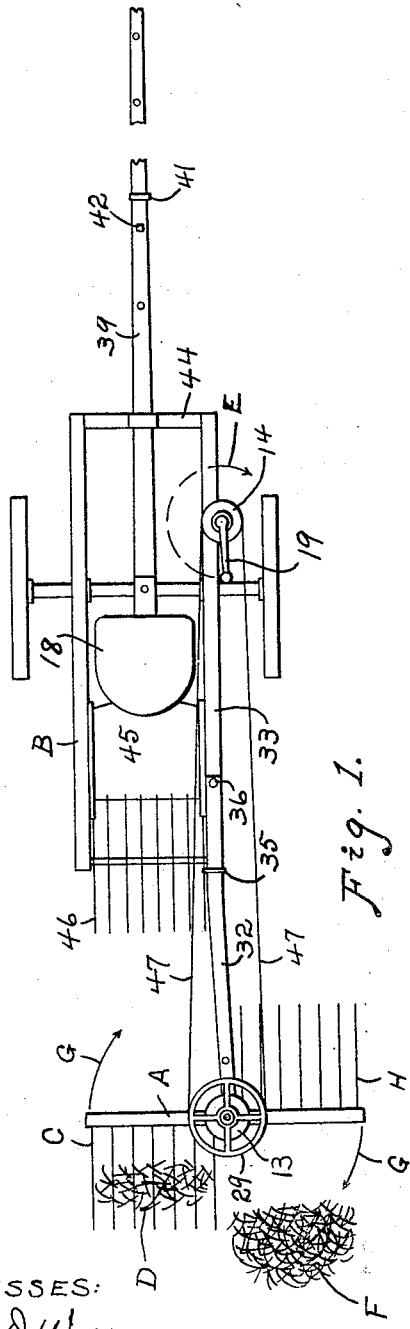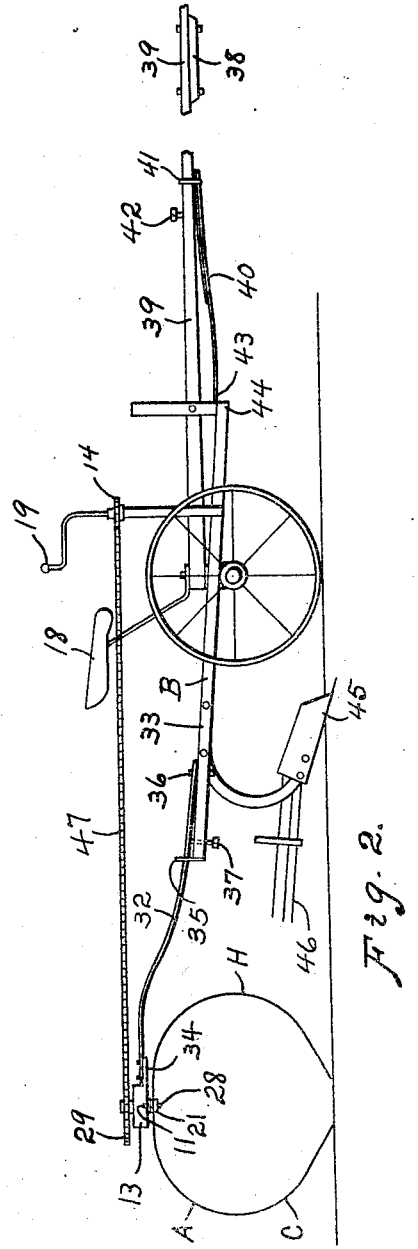

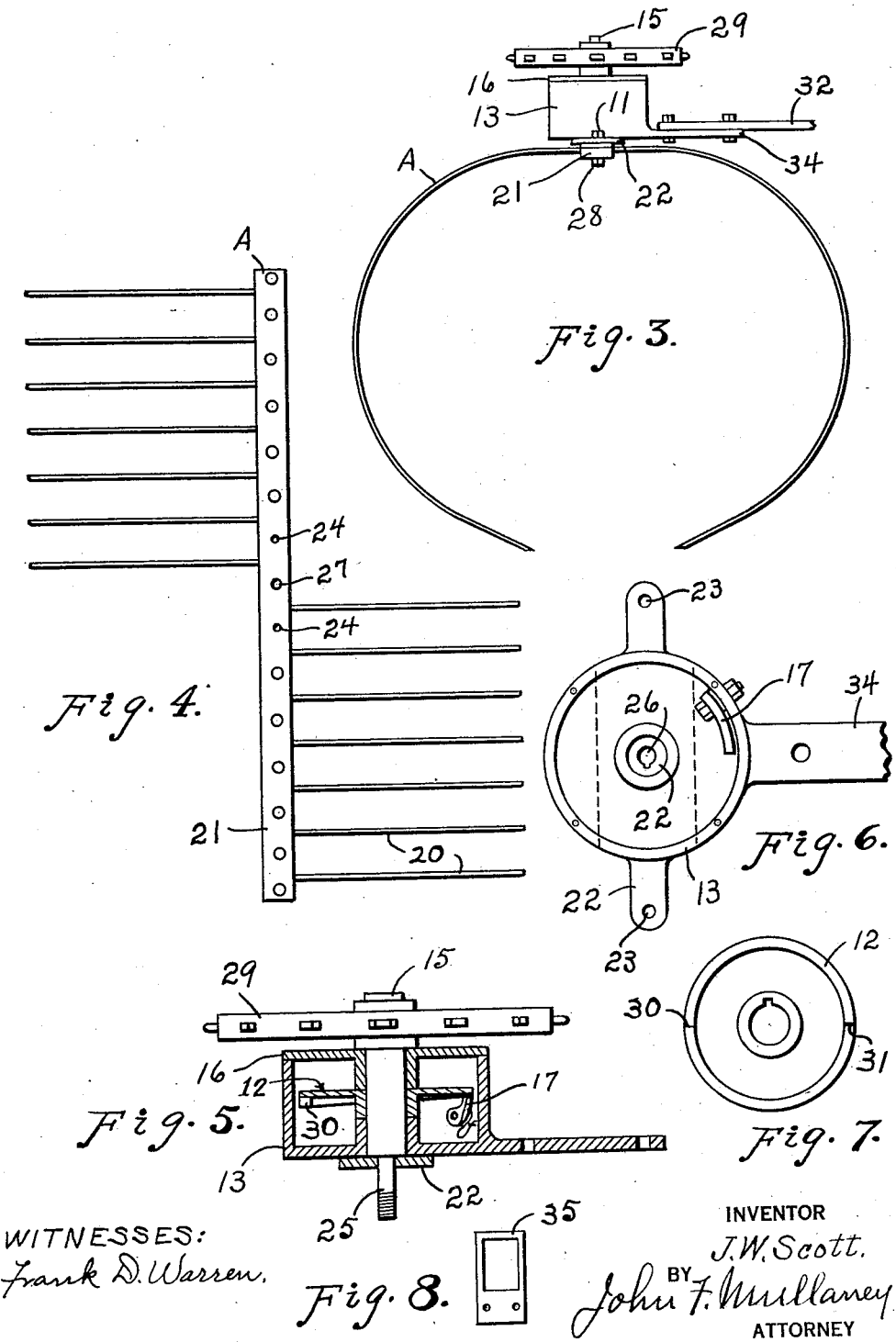

1,507,937

UNITED STATES PATENT OFFICE.

JAMES WADDLE SCOTT, OF FALCON, COLORADO.

RAKE ATTACHMENT FOR AGRICULTURAL IMPLEMENTS.

Application filed July 6, 1922. Serial No. 573,143.

*To all whom it may concern:*

Be it known that I, JAMES WADDLE SCOTT, a citizen of the United States, residing at Falcon, in the county of El Paso and State of Colorado, have invented a new and useful Rake Attachment for Agricultural Implements, of which the following is a full, clear, and exact description.

One object of this invention is to provide a rake attachment for agricultural implements that will handle crops carefully and avoid threshing them out while gathering them. Another object is to place the collected material at one side and out of the way of the team on its next trip around the field, as later described.

Fig. 1 is a plan view of the rake A, and is shown attached to a harvesting machine B. Applicant was granted Patents No. 396,433 issued Jan. 22, 1889 and No. 1,345,964 issued July 6, 1920, for agricultural implement on said machine B, and therefore only such portions thereof are shown in the drawings as are necessary to show this new improvement in its relation to said machine B and the utility of said rake A. Fig. 2 is a side elevation view of Fig. 1. Fig. 3 is an enlarged view of the rake A, as it appears in Fig. 2. Fig. 4 is a plan view of Fig. 3, certain portions being removed which are hereinafter described. Fig. 5 is a sectional view of the ratchet gear 12 and its housing 13, the sprocket wheel 14 and shaft 15 being shown in elevation. Fig. 6 is a plan view of the said housing 13 with the cover 16 removed to show the interior and the pawl 17. Fig. 7 is a view of the ratchet gear 12, showing same inverted. Fig. 8 is an elevation of the guide member 35 for limiting the movements of the arm 32.

In operating the rake A; as the machine proceeds forward the section C of said rake A follows directly behind the said machine B and in operative position and gathers the bean straw or other material as represented by the straw pile D in Fig. 1. When the desired amount has been collected and the operator wishes to dump it he (being mounted on the seat 18) turns the crank 19 one complete revolution in the direction indicated by the dotted line and arrow E in Fig. 1, and by means of the chain 47 he imparts a half revolution to the sprocket wheel 29 which has twice the diameter of the smaller sprocket wheel 14, and by this means he swings the rake A a half revolution in the direction indicated by the arrows G in Fig. 1, and thereby carries said straw and leaves it in the position shown by the straw pile F. In this manner the said straw is raked to one side and removed from the path of the team on its next journey around the field. The particular advantage derived from dumping the harvested material, such as ripe beans, in this manner is that the rake simply turns the pile of straw around and backs away from it without upsetting it or disturbing it in the least and therefore does not shell out the beans or other crop.

The section H of the rake A proceeds in a backward position until it is swung around again into operative position as shown by section C. The rake teeth 20 are secured in the frame or bar 21 in any suitable manner. The plate 22 is bolted to the said bar 21, the bolts 11 passing thru holes 23 in said plate 22 and thru holes 24 in said bar 21. The reduced end 25 of the shaft 15 passes thru the hole 26 in the said plate 22 and thru the hole 27 in the frame 21, and the said plate 22 and frame 21 are securely clamped together by the nut 28. The said plate 22 is keyed to the shaft 15. The sprocket wheel 29 and the ratchet gear 12 are also keyed to the said shaft 15. The ratchet gear 12 has two teeth or stops 30 and 31 which form engagements with the pawl 17, so that when the said pawl is engaged with either of said stops, one of the ends of said rake is in operative position.

A flexible bar or arm 32 is adjustably secured to the frame 33 of the machine B and extends rearwardly from said machine and supports the said rake A by being bolted to the flange 34 of the housing 13. The said arm 32 is secured to the said frame 33 by a bolt 36, and may be elevated or lowered by means of the adjusting screw 37, and the said arm is held in place by the guide member 35 which is secured to the said frame 33.

The machine B is provided with a counterbalance consisting of a metal weight 38 bolted to the tongue 39 as shown, with portions of said tongue broken away. A counterbalancing spring member 40 is secured to the said tongue by a clip 41, and tension of said spring is secured by means of the adjusting screw 42. The rear end 43 of said spring 40 rests upon the forward end 44 of the frame 33 and assists in maintaining a balance of the machine and in regulating the depth of the furrow made by the plow share 45.

The shaker device 46 and other details of the machine B are shown more fully in the patents previously referred to.

Having thus described my invention, what I desire to secure by Letters Patent is:

1. A rake attachment for use in connection with agricultural implements, resilient means for attaching said rake to said implement, pivotal means for rotating said rake, actuating means for making a half revolution of said rake by the hand of the operator, and ratchet means for retaining said rake in operative position.

2. A revolving rake mechanism for use in combination with a farm implement, flexible means for attaching said rake to said implement, actuating hand-power means for revolving said rake and ratchet means for holding said rake in operative position.

3. A revolving rake mechanism for use in combination with an agricultural implement, resilient means for attaching said rake to said implement, means for pivoting said rake at its center, means for retaining it in operative position and means for revolving it upon its pivot.

JAMES WADDLE SCOTT.

Witness:
FRANK D. WARREN.